Patented Nov. 4, 1952

2,616,897

UNITED STATES PATENT OFFICE 2,616,897

PRODUCTION OF ALKENYL THIOPHENES

Herman Pines and Bruno Kvetinskas, Chicago, Ill., assignors to Universal Oil Products Company, Chicago, Ill., a corporation of Delaware No Drawing. Application June 26, 1946, Serial No. 679,573

2 Claims. (Cl. 260—329)

This invention relates to new compositions of matter consisting of novel chemical compounds. It is more specifically concerned with thiophenes in which at least one of the nuclear hydrogen atoms has been replaced by a tertiary alkenyl group. This application is a continuation-in-part of our earlier application Serial No. 651,435, filed March 1, 1946.

It is an object of this invention to provide thiophenes in which at least one of the nuclear hydrogen atoms has been replaced by an olefinic tertiary hydrocarbon radical. Such compounds are useful as chemical intermediates for the synthesis of medicinals, bactericides, insecticides, and other organic compounds and in the preparation of sulfur-containing plastics. Alkenyl thiophenes, in which the carbon atom of the side chain that is attached to the thiophene nucleus is joined to three other carbon atoms in the side chain, are more readily polymerized than other types of alkenyl thiophenes and produce more highly branched polymers.

In one embodiment my invention relates to a compound of the following formula:

in which at least one of the substituents $R^1$, $R^2$, $R^3$, and $R^4$ is a tertiary alkenyl radical and the other substituents are selected from the group consisting of hydrogen, alkyl, cyclo-alkyl, alkenyl, aryl, alkaryl, aralkyl, and naphthyl radicals.

The compounds of this invention may be produced by alkenylating a thiophene containing at least one substitutable nuclear position with an aliphatic or cyclic diolefin in which at least one of the double bonds is attached to a tertiary carbon atom. Examples of such diolefins are isoprene, 2-methylpentadiene-1,3, 2-methylpentadiene-1,4, 1-methylcyclopentadiene-1,3, and 2-methylcyclohexadiene-1,3. In general, the conjugated diolefins are more active than the non-conjugated diolefins. Diolefins, such as 2,5-dimethylheptadiene-1,5, in which both of the double bonds are attached to tertiary carbon atoms, can be used, but they tend to react with two molecules of thiophene to yield dithienyl alkanes. The use of the term "tertiary alkenyl radical" in this specification and the appended claims is meant to cover monoolefinic tertiary aliphatic hydrocarbon radicals and monoolefinic tertiary cyclic hydrocarbon radicals.

A thiophene which is convertible into a tertiary alkenyl thiophene by alkenylation contains at least one hydrogen atom bound to the heterocyclic ring of one carbon atom and one sulfur atom. The different alkenylatable thiophenes may be represented by the formula:

in which at least one of the groups $R^1$, $R^2$, $R^3$, and $R^4$ is a hydrogen atom, and the other R groups are selected from the group consisting of hydrogen, alkyl, cycloalkyl, alkenyl, aryl, alkaryl, aralkyl, and naphthyl radicals.

Substances which catalyze the alkenylation of a thiophene with a tertiary diolefin include stannic chloride. This metal halide catalyst is preferably used in a substantially anhydrous form and may be used as such or deposited on substantially inert carriers, such as crushed quartz, porcelain, fire brick, and similar granular materials. In some cases it is advantageous to add a hydrogen halide, such as hydrogen chloride, to the reaction mixture.

The alkenylation process by which our novel compounds are prepared may be carried out in batch operation by placing a quantity of the alkenylation catalyst in the reactor equipped with a stirring device, adding the thiophene, heating to a reaction temperature, slowly adding the diolefin while mixing the contents of the reactor, cooling the reaction mixture and recovering the alkenylated thiophene. However, the preferred method of operation is of the continuous type. If the alkenylation catalyst is liquid, it is continuously charged to a reactor together with the thiophene and the alkenylating agent. The reactor effluent is passed to a settler wherein a separation is effected between the catalyst phase and the thiophene-hydrocarbon phase. At least a portion of the catalyst phase is continuously recycled to the reaction zone and the thiophene-hydrocarbon phase is processed for recovery of the desired products. If the alkenylation catalyst is a solid, it may be disposed as a fixed bed within a reactor and the reactants continuously passed through the bed at alkenylation conditions. The alkenylate in the effluent is recovered and the unreacted hydrocarbons and unconverted thiophene may be separated and recycled to the alkenylation step for further reaction.

The process of this invention may be conducted at temperatures within the range of from about —20° C. to about 175° C. The preferred temperature will depend to some extent upon the particular thiophene and diolefin charged to the process and upon the activity of the particular alkenylation catalyst employed. The pressure should be such that substantially all of the reactants are in the liquid phase. In general these pressures will lie in the range of from 1 atmosphere to about 100 atmospheres. When a liquid catalyst is used, the contact time may be in the range of from about three minutes to about three hours. If a solid catalyst is used in a fixed bed, the liquid hourly space velocity, defined as the volume of total feed to the alkenylation zone per hour divided by the superficial volume of catalyst in said zone, should be in the range of from about 0.1 to about 10. A molecular excess of the thiophene over the diolefin in the reaction zone promotes alkenylation and suppresses side reactions.

The following examples are given to illustrate our invention but they are not introduced with the intention of unduly limiting the generally broad scope of said invention.

*Example I*

Seventy-six grams of thiophene and 15 grams of stannic chloride were placed in a 250 ml. alkylation flask. To this was added over a period of 2 hours at room temperature 20.5 grams of 2-methylpentadiene-1,3. The temperature was then raised to 50° C. After this the product was cooled and the catalyst phase removed. The organic layer weighing 92 grams was washed, dried, and distilled. Forty-eight grams of thiophene was recovered. Analysis showed that 73 mol per cent of the methylpentadiene reacted to form 2-(1',1'-dimethyl-2'-butenyl)-thiophene and 20% of the diene yielded dihexenyl thiophene. The monoalkenylthiophene had a boiling point of 79° C. at 5.5 mm. pressure and a $n_D^{20}$ of 1.5175.

*Example II*

Seventy-six grams of thiophene was reacted with 17 grams of isoprene in the presence of 15 grams of stannic chloride in the manner described under Example I. Upon completion of the experiment, the upper layer, which weighed 84 grams, was washed, dried, and distilled. Forty-seven grams of thiophene was recovered. It was shown that on the basis of isoprene reacted, the yield of 2-(1',1'-dimethyl-propenyl)-thiophene was 71% and that the yield of dipentenyl thiophene was 11%. The dimethylpropenylthiophene had a boiling point of 89° C. at 15 mm. pressure, a $n_D^{20}$ of 1.5269, and a density of 0.9788 at 20° C.

*Example III*

Seventy grams of thiophene is reacted with 25 grams of 2-methylcyclohexadiene-1,3 in the presence of a stannic chloride catalyst in the manner described under Example I. The compound 2-(1'-methyl-2'-cyclohexenyl)-thiophene is identified in the product.

*Example IV*

50.4 grams of thiophene and 22.3 grams of stannic chloride were mixed in a glass reactor provided with a motor driven stirrer and isobutylene was introduced to the stirred mixture until a total of 17.5 grams of the olefin had been introduced. At the beginning of the reaction, the temperature was 20° C. but due to the heat of reaction this increased to 50° C. when all of the isobutylene had been added at the end of 1.25 hours. The reaction product was then washed with water, dried, and distilled. After removing the excess of unconverted thiophene, a mixture of tertiary-butylthiophenes remained. Of the isobutylene charged to the reaction, 18.5% was converted into monotertiary-butylthiophene and 50% into ditertiary-butylthiophene. In addition, 10 grams of a brown solid remained as a distillation residue. The monotertiary-butylthiophene boiled at 61.3° C. at a pressure of 21 mm. of mercury and had a refractive index, $n_D^{20}$, of 1.4976, and a density of 0.9501 at 20° C.; the ditertiary-butylthiophene boiled from 101° to 107° C. at 17 mm. pressure and had a refractive index, $n_D^{20}$, of 1.4930.

The monotertiary-butylthiophene was reacted with isoprene and 2-methylpentadiene-1,3 according to the procedure described in the preceding examples. In both experiments 2-alkenyl-5-alkylthiophenes were identified in the product. Isopropyl thiophene, secondary butylthiophene, and cyclohexylthiophene were alkenylated in a similar manner with similar results.

We claim as our invention:

1. A process for producing an alkenyl thiophene which comprises catalytically reacting a thiophene having a nuclear hydrogen atom with a diolefin containing one tertiary double bond and one non-tertiary double bond.

2. A process for producing an alkenyl thiophene which comprises reacting a thiophene having a nuclear hydrogen atom with a diolefin containing one tertiary double bond and one non-tertiary double bond at a temperature of from about −20° C. to about 175° C. in the presence of stannic chloride.

HERMAN PINES.
BRUNO KVETINSKAS.

REFERENCES CITED

The following references are of record in the file of this patent:

UNITED STATES PATENTS

| Number | Name | Date |
|---|---|---|
| 2,141,611 | Malishev | Dec. 27, 1938 |
| 2,490,270 | Johnson | Dec. 6, 1949 |

OTHER REFERENCES

Von Richter: "The Chemistry of the Carbon Compounds," vol. III, p. 446, Elsevier Publ. Co., N. Y., 1946.

Beilstein: "Handbuch der Organischen Chemie," vol. 5, p. 523, 1922.

Richter: "Organic Chemistry," pp. 649–650, 1938.